(12) United States Patent
Cortequisse

(10) Patent No.: US 8,133,011 B2
(45) Date of Patent: Mar. 13, 2012

(54) DEVICE FOR STIFFENING THE STATOR OF A TURBOMACHINE AND APPLICATION TO AIRCRAFT ENGINES

(75) Inventor: Jean-François Gérard Jacques Cortequisse, Heers (BE)

(73) Assignee: Techspace Aero, Milmort Herstal (BE)

( * ) Notice: Subject to any disclaimer, the term of this patent is extended or adjusted under 35 U.S.C. 154(b) by 614 days.

(21) Appl. No.: 12/336,664

(22) Filed: Dec. 17, 2008

(65) Prior Publication Data

US 2009/0169375 A1 Jul. 2, 2009

(30) Foreign Application Priority Data

Dec. 26, 2007 (EP) ..................................... 07124069

(51) Int. Cl.
*F01D 25/04* (2006.01)
(52) U.S. Cl. ....................... 415/119; 415/142; 415/209.4
(58) Field of Classification Search .................. 415/191, 415/187, 193, 194, 195, 185, 209.1, 209.4, 415/210.1, 142
See application file for complete search history.

(56) References Cited

U.S. PATENT DOCUMENTS

| 5,740,674 A | * | 4/1998 | Beutin et al. ................. 60/226.1 |
| 2006/0275110 A1 | | 12/2006 | Baralon |
| 2008/0159680 A1 | | 7/2008 | Gill |

FOREIGN PATENT DOCUMENTS

| EP | 1 426 559 A1 | 6/2004 |
| GB | 2 226 600 A | 7/1990 |

* cited by examiner

*Primary Examiner* — Ross Gushi
(74) *Attorney, Agent, or Firm* — Oblon, Spivak, McClelland, Maier & Neustadt, L.L.P.

(57) ABSTRACT

The invention concerns a novel type of turbomachine. The stator of the turbomachine comprises a plurality of profiled members forming stiffeners arranged on the blade stage. The profiled members are distributed uniformly at periphery of the blade stage and individually between two consecutive blades. The stiffeners are fixed to the internal and external ferrules of the stator in order to uniformly increase the axial and radial stiffness of the stator in normal operation of the turbomachine and to allow the internal ferrules to have a limited displacement during the normal functioning of the turbomachine. This makes it possible to reduce the axial sizing of the turbomachine, and consequently its mass.

10 Claims, 2 Drawing Sheets

DEVICE FOR STIFFENING THE STATOR OF A TURBOMACHINE AND APPLICATION TO AIRCRAFT ENGINES

TECHNICAL FIELD AND PRIOR ART

The invention concerns the field of turbomachines and in particular those constituting aircraft engines, such as jet engines.

At the present time, developments in aerodynamic calculation codes allowing three-dimensional calculations lead to the definition of very thin turbomachine blade profiles with consequently much lower stiffnesses in all directions in space. The use of more lightweight materials (composite materials non-exhaustively) also leads to much lower stiffnesses for the blades in all directions in space. Under nominal and especially exceptional operating conditions of the turbomachine, such as surge and stall phenomena, these reductions in rigidity are such that, under the effect of the aerodynamic pressure of the flows over the blades, significant axial movements occur at the blade root.

Thus the predefined axial clearance between the stator roots and those of the rotor is oversized so as to prevent any axial contact between the stator and the rotor of the turbomachine. This oversizing leads to a greater axial space requirement for a turbomachine having blades of lesser stiffness.

One aim of the invention is therefore to propose a turbomachine with lower axial movements at the blade roots in order to make it more compact axially and to reduce its mass.

In addition, in the recent design of aircraft engines, a device called a decoupler has appeared that makes it possible to lighten the engine. The function of the decoupling device, in the event of loss of a fan blade, is to radially release the closest bearing of the latter to enable the drive shaft to have a precession movement (that is to say to enable it to continue to rotate on itself whilst being radially offset with respect to the axis of the engine) and thereby to prevent imbalance forces from being transferred to the aircraft structure via that of the engine.

Triggering of the decoupler leads to a high rotor-stator contact in the event of triggering of this device. There can thus be noted a movement of the shaft head of several cm whereas the end-of-blade clearances are a few mm. In order to ensure the integrity of the engine structure, it is necessary to have as low as possible radial stiffness of the stator in the event of triggering of this decoupling device in order to dissipate the energy.

Another aim of the invention is therefore to propose an aircraft engine whose stator has a minimal radial stiffness in the event of triggering of the decoupling device.

DISCLOSURE OF THE INVENTION

To do this, an object of the invention is a turbomachine comprising a stator, a rotor arranged internally to the stator, the stator comprising at least one internal ferrule, at least one external ferrule and at least one stage of a plurality X of fixed blades each arranged between the internal and external ferrules, the stator also comprising a plurality P (P<X) of profiled members forming stiffeners arranged on the blade stage while being distributed at its periphery and individually between two consecutive blades, the stiffeners being fixed to the internal and external ferrules in order to increase the axial and radial stiffness of the stator in normal operation of the turbomachine and to enable the internal ferrules to have a limited displacement during the normal functioning of the turbomachine.

Normal functioning of the turbomachine means here and in the context of the invention the nominal operating conditions without physical degradation of all or part of the turbomachine, such as for example the rupture of a blade, and without triggering of the decoupling device in the case where the turbomachine constitutes an aircraft engine.

According to the invention, the stiffeners distributed at the periphery of the blade stage compensate for the lesser axial and radial stiffness thereof and therefore make it possible not to have to provide an oversizing of the axial clearance between the parts of the rotor upstream and the said stator. It is thus possible to size a turbomachine so that it is less bulky and also to reduce its mass.

Advantageously, the stator comprises blades with variable incidence and/or variable profile compared with one another in order to compensate for the aerodynamic disturbances generated by the P stiffeners.

Preferably, the X blades and the P stiffeners are fixed to the internal ferrule according to methods of the same nature.

Advantageously, the X blades in the same stator stage are different: the profiles of the blades can then be calculated differently from one another or those of the blades of the stator on each side of each stiffener P may be different from the profiles of the other blades in one and the same stage.

In the construction according to which the internal ferrule is produced in several segments, the fixing between the segments is advantageously achieved by means of the P stiffeners.

The invention also concerns an aircraft engine consisting of a turbomachine described previously.

For aircraft engines that comprise a decoupling device, the fixing of the P stiffeners with the external ferrule is then advantageously fusible in order to reduce the radial stiffness of the stator in the event of contact between the rotor and the internal ferrule once the decoupler is triggered.

According to the invention, the problem of minimisation of the radial stiffness of the stator in the event of triggering of the decoupler is thus resolved at less cost, only a fusible connection having to be provided when the engine is designed.

According to a variant embodiment, the fusible fixing of each stiffener with the external ferrule of the stator is achieved by pinning of the stiffener with the external ferrule.

According to another variant embodiment according to which the stator comprises a single-piece external ferrule and n internal ferrules each provided with a blade stage, the fusible fixing of each stiffener with the external ferrule of the stator is achieved by tight mounting of the stiffener in a through hole formed in the external ferrule.

The stator according to the invention advantageously constitutes a compressor stator.

The plurality of stiffeners according to the invention can thus be installed in the gas stream of a low-pressure axial compressor of an aircraft engine.

The fields of application of the invention are numerous and in general terms concern all types of stator of a turbomachine.

More particularly, the invention applies to all stators of:
onboard turbomachines, applications in which the mass is a critical parameter,
turbomachines of aircraft and rocket engines,
aircraft engine compressors,
compressors of aircraft engines equipped with decoupling devices leading to a severe rotor-stator contact in the event of triggering of these devices.

DETAILED DISCLOSURE OF PARTICULAR EMBODIMENTS

Figure 1A:
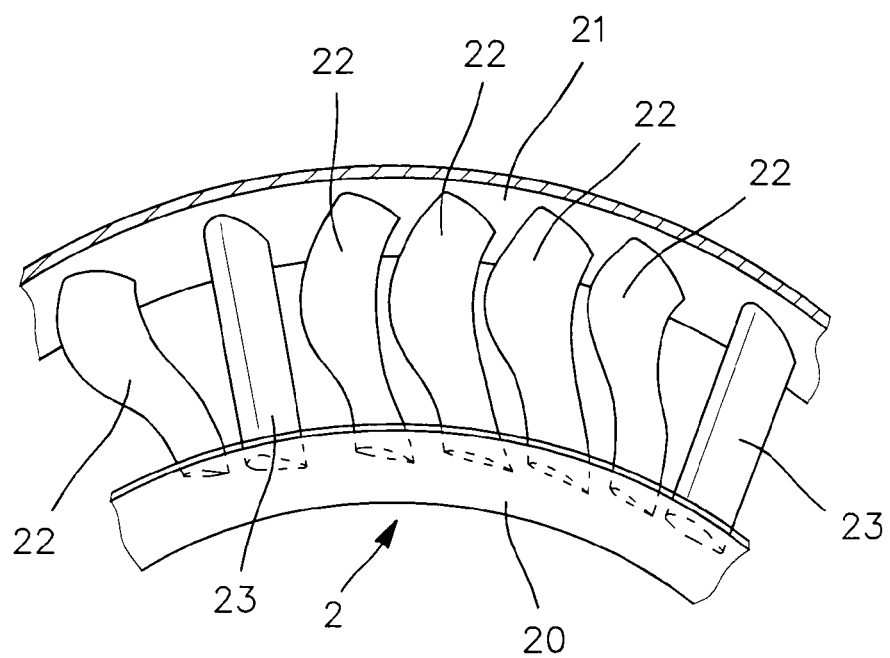
FIGS. 1A, 1B and 1C are respectively a schematic front view, a partial perspective view and a view in longitudinal section of an embodiment of an aircraft engine according to the invention, in normal operation.
Figure 1B:
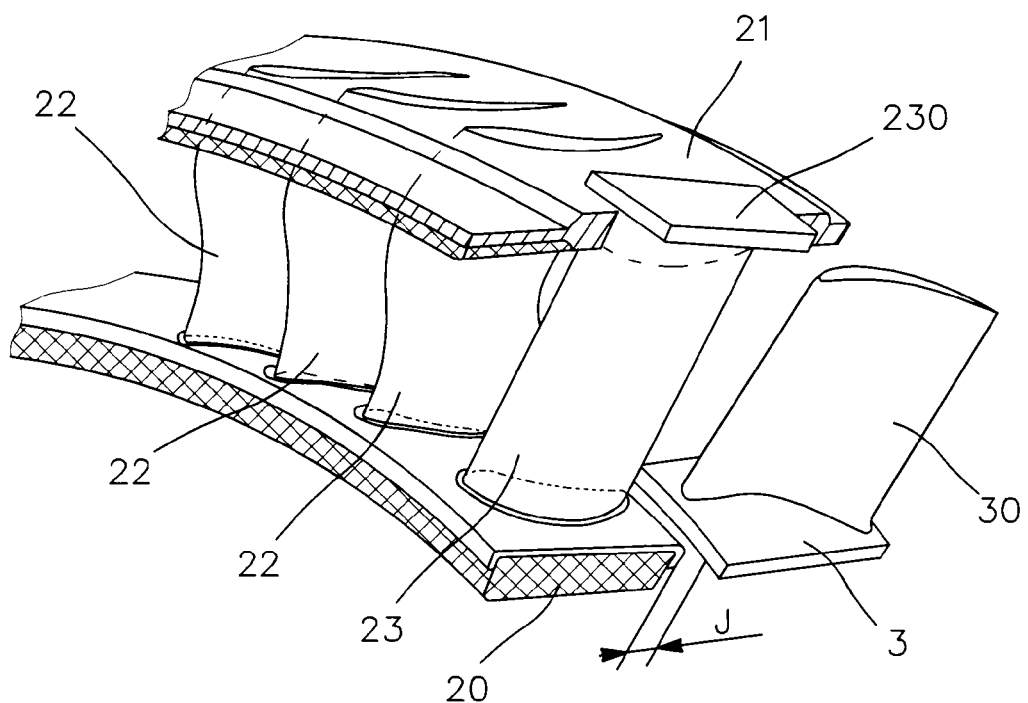

The aircraft engine according to the invention 1 comprises a stator 2, and a rotor 3 arranged internally to the stator.

In the embodiment illustrated, the rotor 3 comprises a rotary blade stage 30.

The stator 2 shown comprises several internal ferrules 20 and only one single-piece external ferrule 21. It also comprises, for each internal ferrule 20, a stage of a plurality X of fixed blades 22 each arranged between one of the internal ferrules 20 and the single-piece external one 21.

In the embodiment illustrated, the stator 2 also comprises a plurality P (P<X) of profiled members 23 forming stiffeners arranged on the blade stage while being distributed uniformly at its periphery and individually between two consecutive blades 22. For example, on the angular portion of the stator shown in FIG. 1A, the stiffeners 23 are P=2 in number while being identical to each other and the blades 22 are X=5 in number while being identical to one another.

As shown, the stiffeners are fixed to the internal 20 and external 21 ferrules: according to the invention they increase the axial and radial stiffness of the stator in normal operation of the aircraft engine 1.

Figure 1C:
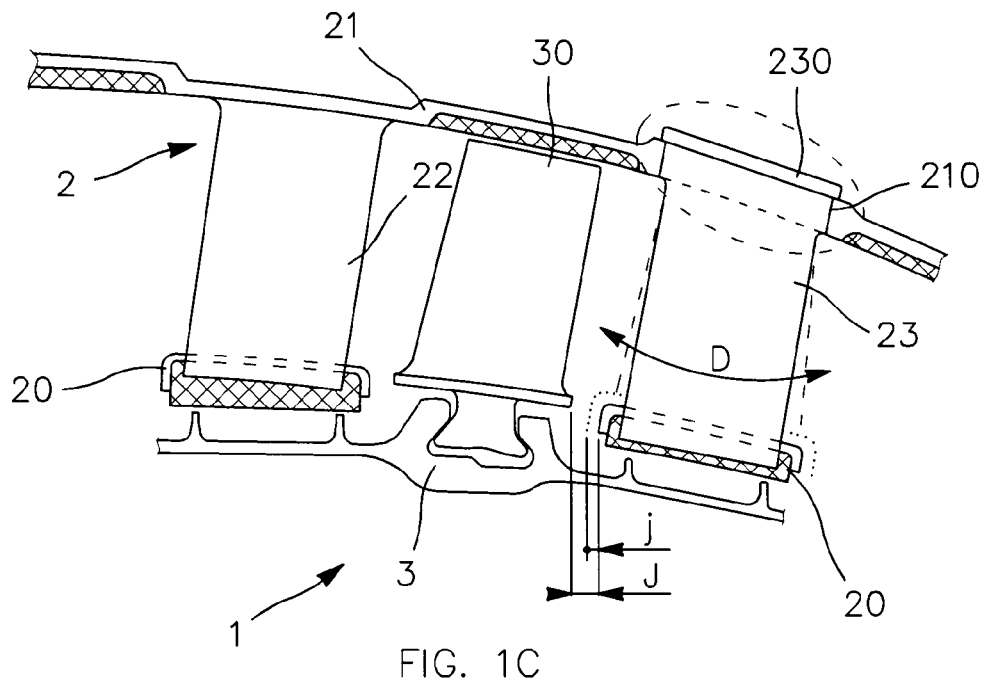

The stiffeners 23 each provide a mechanical connection between the external ferrule 21 and the internal ferrules 20 thus limiting the displacements of the latter in normal operation of the aircraft engine 1. More exactly, as shown in FIG. 1C, the stiffeners 23 enable the internal ferrules 20 to have a limited displacement D during the normal operation of the engine. This limited displacement involves a real operating axial clearance j at the blade roots between the blades 30 of the rotor and the internal ferrule 20 less than the dimensioned axial clearance J. The latter J is therefore, by virtue of the stiffeners according to the invention 23, less than the oversized one provided between a stator blade stage according to the prior art not provided with stiffeners 23.

The mounting of the stiffeners 23 with the external single-piece ferrule 21 is designed to be carried out with a fusible connection 23, 230 (FIG. 1C). In the embodiment illustrated, the fusible connection is produced by a clamping by forcible mounting of the stiffener 23 in a through hole 210 with complementary shapes provided for this purpose in the external ferrule 21. Another type of fusible connection can be provided: it may be a pinning.

As shown, the stiffener has at its end in contact with the top part of the external ferrule 21 a plate 230 of greater dimensions before mounting than the through hole 210 (FIG. 1C), which locks the movement of the stiffener 23 towards the rotor 3 in normal operation of the engine after assembly.

Figure 2:
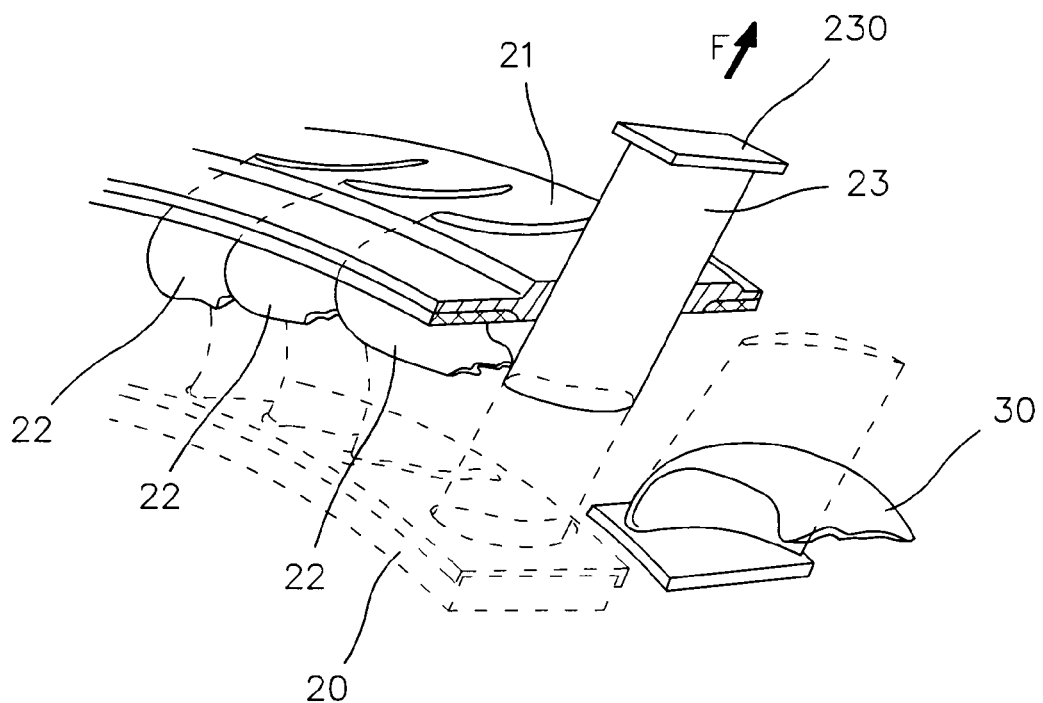
FIG. 2 is a view in partial perspective of an embodiment of an aircraft engine according to the invention showing in broken lines the state of the parts in normal operation and in continuous lines the state of the parts after triggering of a decoupling device.

In the case of triggering of a decoupling device in the aircraft engine (that is to say at the time of severe contact between the rotor and the stator), it may happen that the blades 22 of the stator and those 30 of the rotor 3 crush each other (see solid lines in FIG. 2), the fusible connection 210, 230 of the stiffeners 23 according to the invention then limits or eliminates the radial stiffness of the stator 2. This is because each stiffener 23 can then move freely in the direction of the arrow F in FIG. 2 and pass through the external ferrule 21.

The stiffeners 23 according to the invention can be made from steel, titanium, aluminium or composite.

As illustrated, the stiffeners 23 are fixed at the internal ferrules 20 in the same way as the blades 22.

The advantages of the invention that has just been described are numerous:
reduction of the axial size of the turbomachine by virtue of the reduction in the axial rotor/stator clearances at the foot of the blades;
consequently reduction in the mass of the turbomachine by virtue of the reduction in length, which proves very important for onboard aeronautical and space applications;
possible use of even more optimised blades from the aerodynamic point of view because some stresses relating to the stiffness and mechanical strength of the stator are now borne by the stiffeners according to the invention and where applicable their fusible connection;
possible use of less rigid materials for producing the blades.

The invention claimed is:

1. An aircraft engine, comprising:
a decoupling device; and
a turbomachine including
a stator including
at least one internal ferrule,
at least one external ferrule,
at least one blade stage of a plurality of fixed blades X, each of the fixed blades arranged between the at least one internal ferrule and at least one external ferrule, and
a plurality of profiled members P, where P<X, the plurality of profiled members being stiffeners arranged on the at least one blade stage while being distributed at a periphery thereof, each of the stiffeners being disposed individually between two consecutive blades, and the stiffeners being fixed to the at least one internal ferrule and at least one external ferrule in order to increase axial and radial stiffness of the stator in normal operation of the turbomachine and to enable the at least one internal ferrule to have a limited displacement during normal functioning of the turbomachine, and
a rotor arranged internally to the stator,
wherein the stiffeners are fixed with a fusible fixing to the at least one external ferrule in order to reduce the radial stiffness of the stator in case of contact between the rotor and the at least one internal ferrule once the decoupling device is triggered.

2. The aircraft engine according to claim 1, wherein each of the plurality of blades has a variable incidence and/or a variable profile compared with one another in order to compensate for aerodynamic disturbances generated by the stiffeners.

3. The aircraft engine according to claim 1, wherein the plurality of blades and the stiffeners are fixed to the at least one internal ferrule according to methods of a same nature.

4. The aircraft engine according to claim 1, wherein the plurality of blades of the at least one blade stage of the stator are different.

5. The aircraft engine according to claim 1, wherein profiles of the plurality of blades are fixed differently from one another.

6. The aircraft engine according to claim 1, wherein profiles of the consecutive blades on each side of each stiffener are different from profiles of other blades of the at least one stage.

7. The aircraft engine according to claim 1, wherein the at least one internal ferrule is produced in several segments, and fixing between the segments is achieved via the stiffeners.

8. The aircraft engine according to claim 1, wherein the fusible fixing of each stiffener with the at least one external ferrule of the stator is achieved by pinning each stiffener with the at least one external ferrule.

9. The aircraft engine according to claim 1, wherein the at least one external ferrule is a single-piece external ferrule, and the at least one internal ferrule includes n internal ferrules each provided with a blade stage, and wherein the fusible fixing of each stiffener with the at least one external ferrule of the stator is achieved by tight mounting of each stiffener in a through hole formed in the at least one external ferrule.

10. The aircraft engine according to claim 1, wherein the stator constitutes a compressor stator.

* * * * *